United States Patent
Higuchi et al.

(10) Patent No.: US 11,209,399 B2
(45) Date of Patent: Dec. 28, 2021

(54) REPAIRING MEMBER, FASTENER, AND COLLAR

(71) Applicant: MITSUBISHI HEAVY INDUSTRIES, LTD., Tokyo (JP)

(72) Inventors: Nobuhiro Higuchi, Tokyo (JP); Takashi Yari, Tokyo (JP); Nozomi Saito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 308 days.

(21) Appl. No.: 16/040,011

(22) Filed: Jul. 19, 2018

(65) Prior Publication Data
US 2019/0025260 A1    Jan. 24, 2019

(30) Foreign Application Priority Data

Jul. 20, 2017  (JP) .............................. JP2017-140879

(51) Int. Cl.
*G01N 29/22*    (2006.01)
*G01N 29/07*    (2006.01)
(Continued)

(52) U.S. Cl.
CPC ........... *G01N 29/223* (2013.01); *G01N 29/07* (2013.01); *G01N 29/11* (2013.01); *G01N 29/221* (2013.01);
(Continued)

(58) Field of Classification Search
CPC ...... G01N 29/07; G01N 29/223; G01N 29/11; G01N 29/221; G01N 2291/0234;
(Continued)

(56) References Cited

U.S. PATENT DOCUMENTS 2,692,425 A * 10/1954 Martin .................. B21D 39/03
                                                      29/402.12
4,294,122 A    10/1981 Couchman
(Continued)

FOREIGN PATENT DOCUMENTS

| JP | S64-013433 A | 1/1989 |
| JP | H01-297244 A | 11/1989 |

(Continued)

OTHER PUBLICATIONS

Office Action dated Nov. 26, 2019, issued in counterpart JP Application No. 2017-140878, with English translation. (8 pages).

(Continued)

*Primary Examiner* — Jacques M Saint Surin
(74) *Attorney, Agent, or Firm* — Westerman, Hattori, Daniels & Adrian, LLP

(57) ABSTRACT

To provide a repairing member, a repair structure, and a damage detection method that enable accurate detection of damage that occurs in a repairing member and a repairing target member. The repair structure includes a skin in which an opening is formed, and a plate-like repairing member fixed to the skin to cover the opening. The repairing member has a recess formed on a contact face side in contact with the skin, and an ultrasonic search unit is placed inside the recess. The ultrasonic search unit is placed so as to be in contact with both the repairing member and the skin.

9 Claims, 12 Drawing Sheets

(51) Int. Cl.
*G01N 29/11* (2006.01)
*G01N 29/04* (2006.01)

(52) U.S. Cl.
CPC ......... *G01N 29/041* (2013.01); *G01N 29/043* (2013.01); *G01N 2291/0234* (2013.01); *G01N 2291/0289* (2013.01); *G01N 2291/106* (2013.01); *G01N 2291/2694* (2013.01)

(58) Field of Classification Search
CPC ......... G01N 2291/0289; G01N 29/041; G01N 29/043; G01N 2291/2694; G01N 2291/106
USPC .............................................................. 73/598
See application file for complete search history.

(56) References Cited

U.S. PATENT DOCUMENTS

| | | | |
|---|---|---|---|
| 4,858,853 A | | 8/1989 | Westerman et al. |
| 5,549,803 A | | 8/1996 | Schoess et al. |
| 5,553,504 A | | 9/1996 | Lyons et al. |
| 7,762,142 B2 | | 7/2010 | Rakow et al. |
| 9,855,596 B2 * | | 1/2018 | Plokker ................. B29C 73/10 |
| 2007/0056375 A1 | | 3/2007 | Akdeniz et al. |
| 2011/0088473 A1 * | | 4/2011 | Nelson et al. ...... G01M 5/0091 |
| | | | 340/665 |
| 2011/0181393 A1 | | 7/2011 | Tillotson et al. |
| 2013/0014367 A1 | | 1/2013 | Miller et al. |
| 2013/0014378 A1 | | 1/2013 | Miller |
| 2013/0160923 A1 * | | 6/2013 | Stehmeiner ............. B32B 41/00 |
| | | | 156/64 |
| 2013/0192381 A1 * | | 8/2013 | Becker ................... B29C 73/10 |
| | | | 73/802 |
| 2015/0185128 A1 * | | 7/2015 | Chang .................... B64D 45/00 |
| | | | 702/35 |
| 2016/0137316 A1 * | | 5/2016 | Shigetomi ................ B64F 5/40 |
| | | | 29/402.09 |
| 2016/0274062 A1 | | 9/2016 | Takahashi |
| 2016/0325490 A1 * | | 11/2016 | Safai et al. ......... E04G 23/0229 |
| 2016/0377578 A1 * | | 12/2016 | Landy ................. G01N 29/265 |
| | | | 73/618 |

FOREIGN PATENT DOCUMENTS

| | | |
|---|---|---|
| JP | H08-054376 A | 2/1996 |
| JP | H09-054068 A | 2/1997 |
| JP | H09-505887 A | 6/1997 |
| JP | H09-507709 A | 8/1997 |
| JP | 2004-163125 A | 6/2004 |
| JP | 2013-028332 A | 2/2013 |
| JP | 2013-518320 A | 5/2013 |
| JP | 2014-525852 A | 10/2014 |
| JP | 2015-123963 A | 7/2015 |
| JP | 2016-173336 A | 9/2016 |
| WO | 95/14917 A1 | 6/1995 |
| WO | WO2010038052 * | 4/2010 ........... G01F 23/296 |
| WO | 2013/009909 A2 | 1/2013 |

OTHER PUBLICATIONS

Office Action dated Dec. 3, 2019, issued in counterpart JP Application No. 2017-140879, with English translation. (7 pages).

\* cited by examiner (A)

(B)

(A)

(B)

REPAIRING MEMBER, FASTENER, AND COLLAR

BACKGROUND OF THE INVENTION

Technical Field

The present invention relates to a repairing member, a fastener, and a collar.

Background Art

When the skin or the like (repairing target member) of an aircraft is damaged, the damaged part is repaired by cutting out and removing the damaged part, and closing the cut part by fixing a plate-like repairing member so as to cover the cut part, for example. The repairing member is formed larger than the cut part formed in the repairing target member, and is placed such that a center area of the repairing member covers the cut part while an end area of the repairing member overlaps a neighboring area of the cut part. Then, the part where the repairing member is placed on the repairing target member is secured with a fastener, for example, to fix the repairing member and the repairing target member.

When such repairing is done, in the part where the repairing member overlaps the repairing target member, damage such as corrosion and cracks in a lower face of the repairing member or an upper face of the repairing target member (i.e., faces or the like where the repairing member and the repairing target member come into contact with each other), is not visible from the outside, and therefore may be difficult to detect.

A sensor or the like for detecting damage may be used, to detect damage not visible from the outside, in the faces or the like where the repairing member and the repairing target member come into contact with each other. PCT International Publication No. WO 1995/014917 and U.S. Pat. No. 7,762,142 are examples of a repairing member provided with such a sensor.

PCT International Publication No. WO 1995/014917 discloses a configuration in which multiple strain sensors are embedded in a patch to be fixed to an area on the surface of a structural member. The strain sensors monitor changes in the strain field in the patch-covered area.

U.S. Pat. No. 7,762,142 discloses a device in which an eddy current sensor is provided in the shank of a bolt inserted into a bolt hole formed in an aircraft structure, for example. The device is used to inspect cracks and the like in the vicinity of the bolt.

CITATION LIST

Patent Literature (PTL 1)
WO 1995/014917
(PTL 2)
U.S. Pat. No. 7,762,142

SUMMARY OF INVENTION

Technical Problem

However, since the patch of PCT International Publication No. WO 1995/014917 monitors changes in the strain field in the patch-covered area, damages (e.g., corrosion wastage or minute cracks) that do not include changes in strain may be undetectable.

Meanwhile, the device of U.S. Pat. No. 7,762,142 has an eddy current sensor provided in the shank of a bolt, and is aimed to inspect cracks and the like in the vicinity of a bolt hole. Hence, the device may be incapable of detecting damage such as corrosion and cracks that occur in the vicinity of faces where a repairing member and a repairing target member come into contact with each other.

The present invention has been made in view of the foregoing, and aims to provide a repairing member, a fastener, and a collar that can favorably detect damage that occurs in a repairing member and a repairing target member.

Solution to Problem

To solve the above problem, a repairing member, a fastener, and a collar of the present invention adopt the following solutions.

A repairing member according to an aspect of the present invention is a plate-like repairing member fixed to a repairing target member to cover an opening formed in the repairing target member, the repairing member including an ultrasonic search unit placed on one face side of the repairing member that is in contact with the repairing target member, in which the ultrasonic search unit has a repairing member contact portion in contact with the one face, and a repairing target member contact portion contactable with the repairing target member.

In the above configuration, an ultrasonic wave transmitted from the repairing member contact portion propagates through the inside of the repairing member. Hence, damages such as corrosion and cracks in the repairing member can be detected.

When the ultrasonic search unit and the repairing target member are in contact with each other, an ultrasonic wave transmitted from the repairing target member contact portion propagates through the inside of the repairing target member. Thus, damages such as corrosion and cracks in the repairing target member can be detected.

Hence, damages in both the repairing member and the repairing target member can be detected by merely providing the ultrasonic search unit placed on the one face side of the repairing member. Additionally, since damage and the like are detected by ultrasonic waves, minute damage can be detected as well.

The ultrasonic wave is allowed to propagate directly through each of the repairing member and the repairing target member without passing through other members. Accordingly, the ultrasonic wave propagating through members does not pass through the contact face (interface) between the repairing member and the repairing target member. Hence, attenuation of the propagating ultrasonic wave can be suppressed. This enables a more accurate detection of damage in the members.

Note that the ultrasonic search unit may be brought into contact with the repairing target member or the repairing member with oil or the like interposed therebetween.

In the repairing member according to an aspect of the present invention, multiple ultrasonic search units may be provided, and the multiple ultrasonic search units may be arranged so as to surround the opening.

Damage tends to occur in an area around the opening, due to stress concentration. In the above configuration, since the multiple ultrasonic search units surround the opening, the area around the opening where damage tends to occur can be targeted for detection by the multiple ultrasonic search units. Hence, damage that occurs in the area around the opening can be detected more favorably.

In the repairing member according to an aspect of the present invention, the ultrasonic search unit may include a transmitter ultrasonic search unit capable of transmitting an ultrasonic wave in a direction tilted with respect to the one face of the repairing member, from the repairing member contact portion and the repairing target member contact portion.

In the above configuration, since the ultrasonic wave can be transmitted in a tilted direction, the ultrasonic wave can be transmitted to the repairing member and the repairing target member in a wider range in the thickness direction than when the ultrasonic wave is transmitted horizontally. Also, the ultrasonic wave can be transmitted to the repairing member and the repairing target member in a wider range in the in-plane direction than when the ultrasonic wave is transmitted vertically.

The repairing member according to an aspect of the present invention may further include a recess formed in a recessed shape on the one face side in contact with the repairing target member, and the ultrasonic search unit may be placed inside the recess.

In the above configuration, the recess is provided in the repairing member, and the ultrasonic search unit is placed in the recess. Hence, the ultrasonic search unit can be provided to the repair structure without performing processing for installing the ultrasonic search unit in the repairing target member. Since the repairing target member is not subjected to processing, the repair structure can be applied without reducing the strength and the like of the repairing target member.

A fastener according to an aspect of the present invention includes: a fixing part capable of fixing a repairing target member and a plate-like repairing member that covers the repairing target member; and an ultrasonic sensor capable of transmitting an ultrasonic wave to the repairing target member and the repairing member.

In the above configuration, when an ultrasonic wave is transmitted to the repairing member from the ultrasonic sensor, the ultrasonic wave propagates through the inside of the repairing member. This enables detection of damage such as corrosion and cracks in the repairing member. Additionally, when an ultrasonic wave is transmitted to the repairing target member from the ultrasonic sensor, the ultrasonic wave propagates through the inside of the repairing target member. This enables detection of damage such as corrosion and cracks in the repairing target member.

Accordingly, damage in both the repairing member and the repairing target member can be detected, by merely providing the ultrasonic sensor provided in the fastener that fixes the repairing target member and the repairing member. Additionally, damage in both the repairing member and the repairing target member can be detected without subjecting the repairing target member and the repairing member to processing for providing a separate ultrasonic sensor. Also, since damage and the like are detected by ultrasonic waves, minute damage can be detected as well, and damages relatively far from the fastener can be also detected.

In the fastener according to an aspect of the present invention, the ultrasonic sensor may be provided on an outer surface of the fixing part.

In the above configuration, since the ultrasonic sensor is provided on the outer surface of the fixing part, the ultrasonic sensor is brought into contact with at least one of the repairing target member and the repairing member. Hence, ultrasonic waves are allowed to propagate through at least one of the repairing target member and the repairing member without passing through the interface between the repairing target member and the repairing member. Accordingly, attenuation of the ultrasonic wave at the interface can be suppressed, and damage can be detected more accurately.

Moreover, since the ultrasonic sensor is exposed to the outside, a lead wire or the like can be connected easily to the ultrasonic sensor.

In the fastener according to an aspect of the present invention, the ultrasonic sensor is provided inside the fixing part.

In the above configuration, since the ultrasonic sensor is provided inside the fixing part, the ultrasonic sensor does not come into contact with the repairing target member and the repairing member. Hence, load of the repairing target member and the repairing member does not act directly on the ultrasonic sensor. For this reason, excessive load is not applied on the ultrasonic sensor so that breakage of the ultrasonic sensor can be prevented. Also, although a load acting on the ultrasonic sensor may inhibit appropriate transmission or the like of an ultrasonic wave, no excessive load acts on the ultrasonic sensor in the above configuration, so that an ultrasonic wave can be transmitted appropriately.

In the fastener according to an aspect of the present invention, multiple ultrasonic sensors may be provided.

In the above configuration, damages such as corrosion and cracks in the repairing member and the repairing target member can be detected favorably by the multiple ultrasonic sensors.

A collar according to an aspect of the present invention fixes a repairing target member and a plate-like repairing member that covers the repairing target member. The collar includes an ultrasonic sensor on one face side that is in contact with any one of the repairing member and the repairing target member.

In the above configuration, an ultrasonic wave transmitted by the ultrasonic sensor propagates through the inside of the repairing member or the repairing target member from a contact portion between the collar and the repairing member or the repairing target member. Hence, damages such as corrosion and cracks in the repairing member or the repairing target member can be detected. Also, damage in both the repairing member and the repairing target member can be detected without subjecting the repairing target member and the repairing member to processing for providing a separate ultrasonic sensor. Also, since damage and the like are detected by ultrasonic waves, minute damage can be detected as well, and damages relatively far from the fastener can be also detected.

Advantageous Effects of Invention

According to the present invention, damage that occurs in a repairing member and a repairing target member can be detected favorably.

DESCRIPTION OF EMBODIMENTS

First Embodiment

Figure 1:
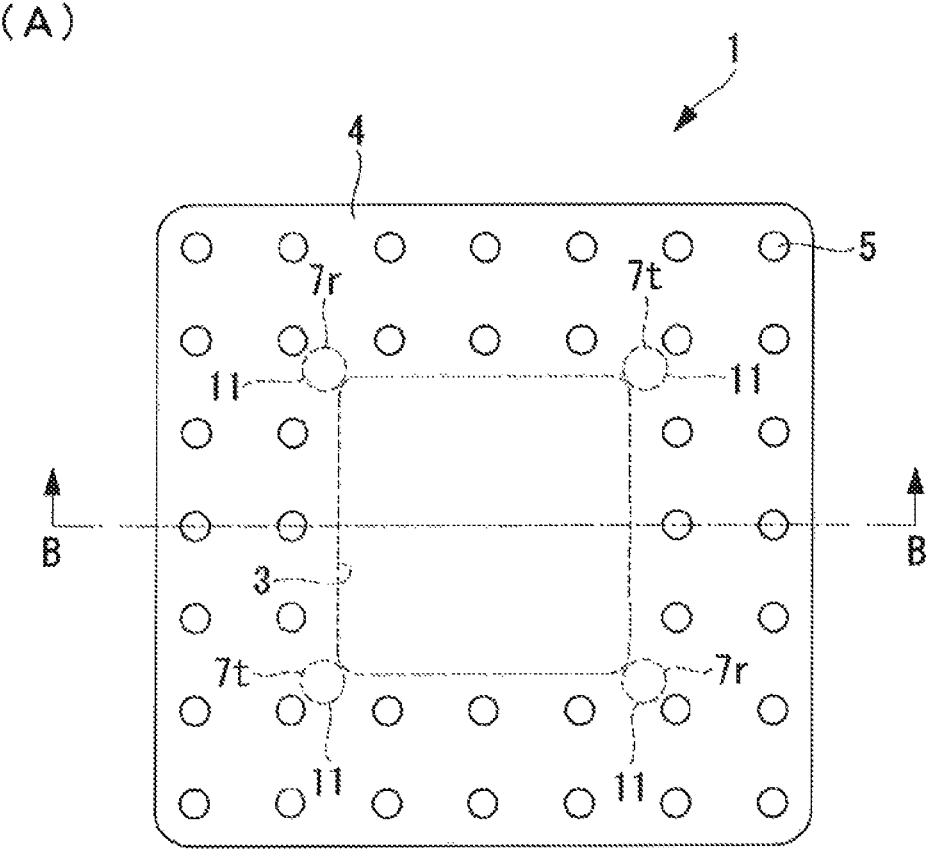
FIG. 1 is a diagram of a repair structure of a first embodiment of the present invention, where (A) is a plan view of the repair structure, and (B) is a cross-sectional view taken along arrow B-B of (A)
Figure 1:
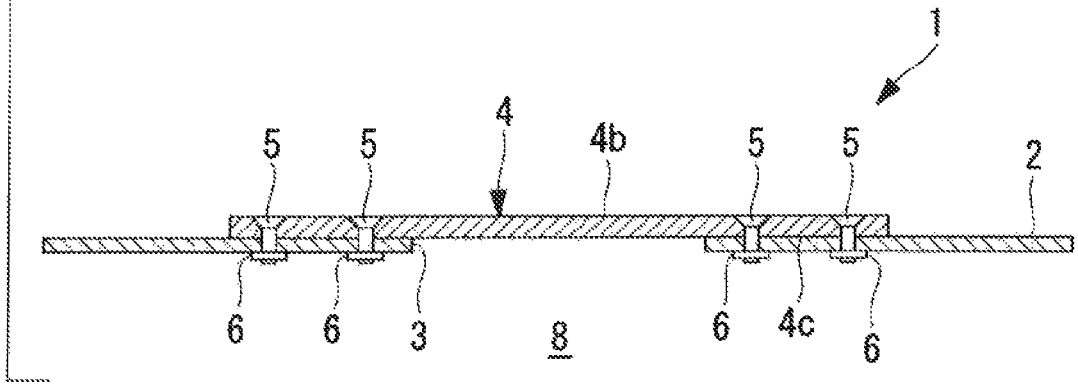

Hereinafter, a first embodiment of a repairing member, a fastener, and a collar of the present invention will be described with reference to the drawings.

A repair structure 1 is applied when a damage occurs in a metal plate or the like and the damaged part is repaired, for example. The embodiment describes a case where damage (e.g., corrosion or cracks) occurs in a skin 2 of an aircraft. In the embodiment, since the repairing is done by cutting out the damaged part, an opening 3 is formed in the skin 2.

The repair structure 1 of the embodiment includes the skin (repairing target member) 2 that has the opening 3 formed by cutting out the damaged part, a repairing member 4 that covers the entire opening 3 from outside the skin 2, an ultrasonic search unit 7 embedded in the repairing member 4, and a fastener 5 and collar 6 that fix the skin 2 and the repairing member 4.

The skin 2 is formed of metal such as an aluminum alloy, and includes therein an internal space 8 of the aircraft. Since the damaged part is cut out, the opening 3 is formed in the skin 2. The opening 3 is formed into a substantially square shape, and its four corners are curved to avoid stress concentration in the corners. In addition, the opening 3 is formed relatively larger than the damaged part to surely cover the entire damage such as a crack in the skin 2.

Multiple fastener holes 2a penetrating the skin 2 are formed in an area surrounding the opening 3 of the skin 2. The multiple fastener holes 2a are arranged at regular intervals, so as to be parallel to edges forming the four sides of the opening 3.

The repairing member 4 is a substantially square metal plate-like member, and has an exposed face 4b exposed to the outside and a contact face 4c opposite to the exposed face 4b and in contact with the skin 2. The repairing member 4 is formed larger than the opening 3, and is fixed to the skin 2 in such a manner as to cover the entire opening 3. Specifically, the repairing member 4 has a center part which is an area covering the opening 3, and a fixed part which is an area surrounding the center part and fixed to the skin 2. The contact face 4c in the fixed part is in contact with the skin 2. The repairing member 4 is formed relatively larger than the opening 3 to prevent occurrence of a crack from the opening 3.

Multiple fastener holes 4a are formed in the fixed part. The multiple fastener holes 4a are formed in positions corresponding to the multiple fastener holes 2a formed in the skin 2. The fastener hole 2a formed in the skin 2 and the fastener hole 4a formed in the repairing member 4 are connected to form a fastener through hole 10. That is, the fastener through hole 10 is a hole that penetrates the repairing member 4 and the skin 2, and multiple fastener through holes 10 are formed. The fastener 5 is inserted into each of the multiple fastener through holes 10, The skin 2 and the repairing member 4 are fixed by inserting the fastener 5 into each of the multiple fastener through holes 10.

Multiple recesses 11 recessed toward the exposed face 4b side are formed in the contact face 4c in the fixed part. In the embodiment, as shown in FIG. 1, the recess 11 is formed in the vicinity of a corresponding one of the four corners of the opening 3 and is separated by a predetermined distance from the fastener hole 4a. That is, four recesses 11 are formed in such a manner as to surround the opening 3. Each recess 11 has a columnar side face 11a extending perpendicularly toward the exposed face 4b from the contact face 4c, and a bottom face 11b extending parallel to the contact face 4c from an end of the side face 11a on the exposed face 4b side.

The ultrasonic search unit 7 of the embodiment includes two types which are a transmitter ultrasonic search unit 7t that transmits an ultrasonic wave, and a receiver ultrasonic search unit 7r that receives an ultrasonic wave transmitted by the transmitter ultrasonic search unit 7t. Both of the ultrasonic search units 7 are placed in the recess 11 formed in the repairing member 4. One of the transmitter ultrasonic search unit 7t and the receiver ultrasonic search unit 7r is placed in a single recess 11. In the embodiment, different types of ultrasonic search units 7 are placed in adjacent recesses 11 arranged along the opening 3. That is, the transmitter ultrasonic search unit 7t and the receiver ultrasonic search unit 7r are arranged alternately along the opening 3.

The transmitter ultrasonic search unit 7t and the receiver ultrasonic search unit 7r are a disc-like member having a thickness of 1 to 2 millimeters and a diameter of 5 to 6 millimeters. The transmitter ultrasonic search unit 7t and the receiver ultrasonic search unit 7r are each placed in the recess 11 such that one face (repairing member contact portion) 7a of circular faces is brought into contact with the bottom face 11b of the recess 11, while the circular other face (repairing target member contact portion) 7b is flush with the contact face 4c of the repairing member 4. In other words, when the skin 2 comes into contact with the repairing member 4r the other face 7b of the ultrasonic search unit 7

(transmitter ultrasonic search unit 7*t* and the receiver ultrasonic search unit 7*r*) also comes into contact with the skin 2. Note that the bottom face of the recess 11 and each of the transmitter ultrasonic search unit 7*t* and the receiver ultrasonic search unit 7*r* may be in contact with each other with an oil or the like interposed therebetween, instead of being in direct contact with each other. The skin 2 and each of the transmitter ultrasonic search unit 7*t* and the receiver ultrasonic search unit 7*r* may also be in contact with each other with an oil or the like interposed therebetween instead of being in direct contact with each other.

A signal wire (not shown) is connected to the transmitter ultrasonic search unit 7*t* and the receiver ultrasonic search unit 7*r*. The signal wire connects the transmitter ultrasonic search unit 7*t* or the receiver ultrasonic search unit 7*r* with a controller (not shown) placed in the internal space 8 of the aircraft. The transmitter ultrasonic search unit 7*t* and the receiver ultrasonic search unit 7*r* exchange signals with the controller through the signal wire. When an ultrasonic wave transmission instruction signal is transmitted to the transmitter ultrasonic search unit 7*t* from the controller through the signal wire, an ultrasonic wave is transmitted from the transmitter ultrasonic search unit 7*t*. When the receiver ultrasonic search unit 7*r* receives an ultrasonic wave, a signal is transmitted to the controller through the signal wire. The signal wire extends to the internal space 8 of the aircraft through an insertion hole of the signal wire formed in the skin 2, and is connected to the controller.

Figure 2:
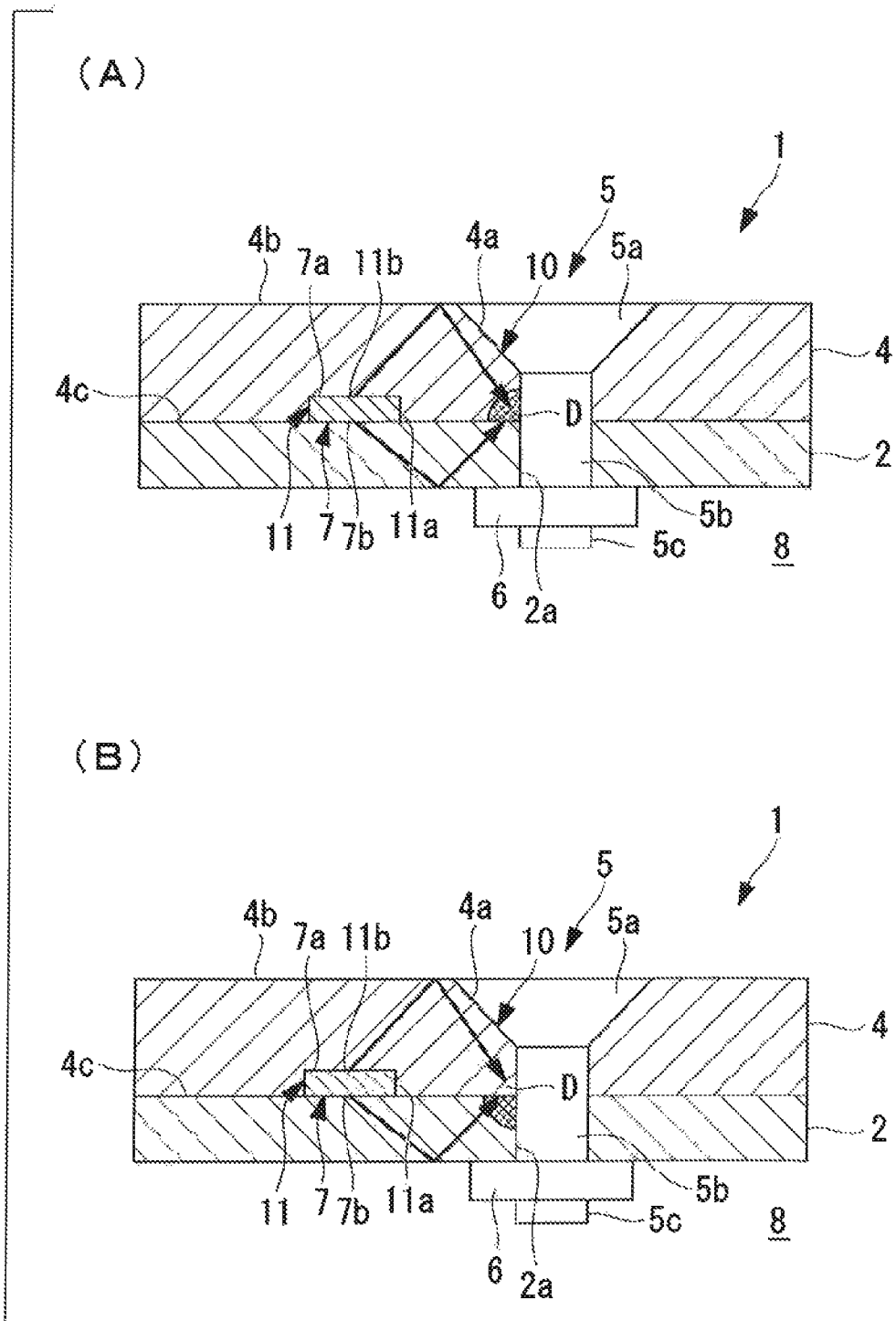
FIG. 2 is a schematic cross-sectional view of a main part of the repair structure of FIG. 1, where (A) is a diagram of a case where damage occurs on the repairing member side, and (B) is a diagram of a case where damage occurs on the repairing target member side.

The transmitter ultrasonic search unit 7*t* is configured to transmit an ultrasonic wave to the inside of the skin 2 and the repairing member 4 to be inspected, and transmits the ultrasonic wave upon application of a high voltage (aforementioned ultrasonic wave transmission instruction signal) from the controller through the signal wire. In the embodiment, as shown in FIG. 2, the transmitter ultrasonic search unit 7*t* transmits an ultrasonic wave in a direction tilted with respect to the one face 7*a* of the transmitter ultrasonic search unit 7*t*, from the one face 7*a*. The ultrasonic wave transmitted from the one face 7*a* propagates through the inside of the repairing member 4. Additionally, the transmitter ultrasonic search unit 7*t* transmits an ultrasonic wave in a direction tilted with respect to the other face 7*b* of the transmitter ultrasonic search unit 7*t*, from the other face 7*b*. The ultrasonic wave transmitted from the other face 7*b* propagates through the inside of the skin 2. The receiver ultrasonic search unit 7*r* is configured to receive an ultrasonic wave transmitted from the transmitter ultrasonic search unit 7*t*, and measures the reception state by measuring voltages on both ends of the receiver ultrasonic search unit 7*r*.

The controller is configured of a central processing unit (CPU), a random access memory (RAM), a read only memory (ROM), and a computer-readable storage medium, for example. The series of processing for implementing various functions is stored in a storage medium and other parts in the form of a program, for example, and the functions are implemented when the CPU reads out the program onto the RAM and the like to process information and perform information processing and calculation. Note that the program may be previously installed in a ROM or another storage medium, be provided by being stored in a computer-readable storage medium, or be distributed through a wired or non-wired communication means. A computer-readable storage medium includes a magnetic disc, a magneto-optical disc, a CD-ROM, a DVD-ROM, and a semiconductor memory.

Multiple fasteners 5 are provided, and as shown in FIG. 1, the fasteners 5 are respectively inserted into the multiple fastener through holes 10. As shown in FIG. 2, each of the fasteners 5 has a substantially truncated cone shaped head portion 5*a*, and a columnar shank portion 5*b* extending in a predetermined direction from one end of the head portion 5*a*. The entire head portion 5*a* is placed inside the fastener hole 4*a* formed in the repairing member 4, so as not to protrude from the exposed face 4*b* of the repairing member 4. The tip end of the shank portion 5*b* protrudes into the internal space 8 from the skin 2, and the annular collar 6 engages with a protruding portion 5*c* of the shank portion 5*b* to fix the skin 2 and the repairing member 4.

Next, a description will be given of a repair method of the skin 2 to which the repair structure 1 of the embodiment is applied.

First, the opening 3 is formed in the skin 2, by cutting out a damaged part having occurred in the skin 2 and a neighboring area of the damaged part by a processing unit (not shown). At this time, the opening 3 is formed relatively larger than the damaged part to surely cover the entire damage. Next, the repairing member 4 is placed on the skin 2 in such a manner as to cover the opening 3 from the outside. At this time, the recess 11 is previously formed in the repairing member 4 in a plant or the like, and the ultrasonic search unit 7 is preinstalled in the recess 11. Hence, the work of installing the ultrasonic search unit 7 is not done at the repair site. Next, the fastener 5 is inserted into the fastener through hole 10 formed in the skin 2 and the repairing member 4, and the protruding portion 5*c* of the fastener 5 and the collar 6 are engaged with each other to fix the skin 2 and the repairing member 4. Note that a sealant may be applied on faces at which the repairing member 4 and the skin 2 come into contact, when the repairing member 4 is placed on the skin 2.

Figure 3:
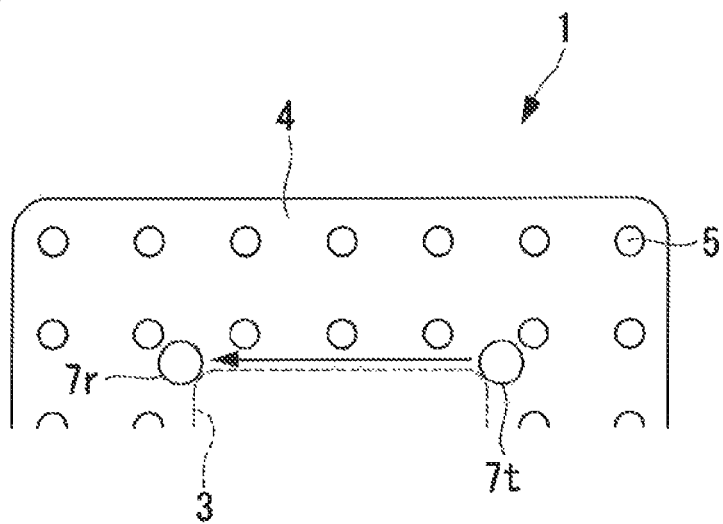
FIG. 3 is a schematic plan view of the repair structure of FIG. 1, where (A) is a diagram of a case where there is no damage, and (B) is a diagram of a case where damage has occurred.
Figure 3:
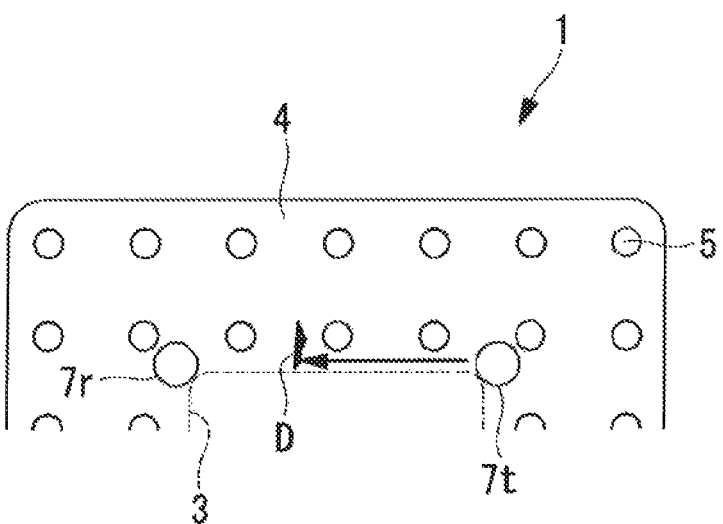

Next, a damage detection method by the repair structure 1 of the embodiment will be described with reference to FIGS. 2 and 3. Note that in FIGS. 2 and 3, black solid arrows schematically indicate ultrasonic waves. In the embodiment, damage is detected by the so-called through transmission damage detection method.

As shown in FIG. 2, the transmitter ultrasonic search unit 7*t* placed in the recess 11 of the repairing member 4 transmits an ultrasonic wave in a direction tilted with respect to the one face 7*a* of the transmitter ultrasonic search unit 7*t*, from the one face 7*a*. That is, the ultrasonic wave transmitted from the one face 7*a* of the transmitter ultrasonic search unit 7*t* propagates through the inside of the repairing member 4. Simultaneously, the transmitter ultrasonic search unit 7*t* transmits an ultrasonic wave in a direction tilted with respect to the other face 7*b* of the transmitter ultrasonic search unit 7*t*, from the other face 7*b*. That is, the ultrasonic wave transmitted from the other face 7*b* of the transmitter ultrasonic search unit 7*t* propagates through the inside of the skin 2.

The ultrasonic waves that propagate through the inside of the repairing member 4 and the skin 2 are received by the receiver ultrasonic search unit 7*r*. Upon receipt of the ultrasonic wave, the receiver ultrasonic search unit 7*r* transmits the reception state to the controller.

As shown in FIG. 3(A), when there is no damage in the repairing member 4 and the skin 2, the ultrasonic wave transmitted from the transmitter ultrasonic search unit 7*t* is received by the receiver ultrasonic search unit 7*r* without being blocked by any damage.

On the other hand, as shown in FIGS. 2(A) and 3(B), when there is damage D such as a crack in the repairing member 4 between the transmitter ultrasonic search unit 7*t* and the receiver ultrasonic search unit 7*r*, a part of the ultrasonic wave propagating through the inside of the repairing member 4 is blocked by the damage D. The blocked ultrasonic wave does not reach the receiver ultrasonic search unit 7r. Additionally, as shown in FIGS. 2(B) and 3(B), when there is the damage D in the skin 2 between the transmitter ultrasonic search unit 7t and the receiver ultrasonic search unit 7r, the ultrasonic wave propagating through the inside of the skin 2 is blocked by the damage D. The blocked ultrasonic wave does not reach the receiver ultrasonic search unit 7r.

Thus, when there is the damage D in any of the repairing member 4 and the skin 2 between the transmitter ultrasonic search unit 7t and the receiver ultrasonic search unit 7r, at least a part of the ultrasonic wave is blocked by the damage D. Hence, the blocked ultrasonic wave is not received by the receiver ultrasonic search unit 7r. Accordingly, when there is the damage D, the transmit-receive state of the ultrasonic wave received by the receiver ultrasonic search unit 7r differs from that when there is no damage.

For this reason, if information on the transmit-receive state transmitted to the controller differs from that when there is no damage between the transmitter ultrasonic search unit 7t and the receiver ultrasonic search unit 7r, it can be determined that there is damage in the repairing member 4 or the skin 2 between the transmitter ultrasonic search unit 7t and the receiver ultrasonic search unit 7r. Hence, damage can be detected.

Note that an example of a usable transmit-receive state when there is no damage, is a transmit-receive state acquired at such times as production and repair completion of the repairing member 4 and the skin 2 when health can be guaranteed.

This damage detection method may be performed during operation of an aircraft, or while operation of an aircraft is stopped. The damage detection method may be performed constantly, or be performed automatically at predetermined intervals. Instead, the damage detection method may be performed at a predetermined time such as at during maintenance, for example.

The embodiment has the following effects.

Damage in both the repairing member 4 and the skin 2 can be detected, by merely providing the ultrasonic search unit 7 placed on the contact face 4c side of the repairing member 4. Additionally, since damage and the like are detected by ultrasonic waves, minute damage can be detected as well.

Figure 6:
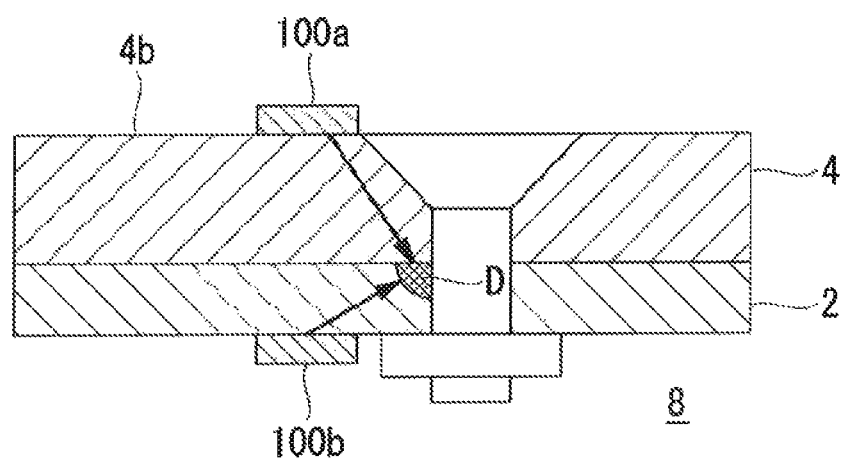
FIG. 6 is a cross-sectional view of a conventional repair structure.

As a method of detecting damage in the repairing member 4 and the skin 2 by an ultrasonic search unit, an ultrasonic search unit 100a may be installed on the exposed face 4b of the repairing member 4, as indicated by reference numeral 100a in FIG. 6. However, in this method, when an ultrasonic wave is transmitted to the skin 2, the transmitted ultrasonic wave passes through the repairing member 4, and also passes through the interface between the repairing member 4 and the skin 2. After thus passing through many members and interfaces, the ultrasonic wave may attenuate and be incapable of detecting damage favorably.

Moreover, as a method of detecting damage in the skin 2 by an ultrasonic search unit, an ultrasonic search unit 100b may be installed on a face on the internal space 8 side of the skin 2, as indicated by reference numeral 100b in FIG. 6. However, since the face on the internal space 8 side of the skin 2 is a face that defines the internal space 8 of the aircraft, various members, equipment, and the like are installed on the face on the internal space 8 side of the skin 2. Specifically, if the skin 2 forms a fuselage portion of the aircraft, interior finishing is provided on the surface on the internal space 8 side, and if the skin 2 forms a wing portion of the aircraft, fuel seal and the like are applied on the face on the internal space 8 side. For this reason, it may be difficult to favorably install an ultrasonic search unit on the face on the internal space 8 side of the skin 2. Additionally, in a narrow portion such as the tip end of the wing portion of the aircraft, for example, the face on the internal space 8 side of the skin 2 is inaccessible, and therefore the ultrasonic search unit cannot be installed.

By contrast, in the embodiment, ultrasonic wave is allowed to propagate directly through each of the repairing member 4 and the skin 2 without passing through other members. Accordingly, the ultrasonic wave propagating through members to detect whether there is damage does not pass through the contact face (interface) between the repairing member 4 and the skin 2. Hence, attenuation of the propagating ultrasonic wave can be suppressed. This enables a more accurate detection of damage in the members. In particular, damage in the skin 2 can be detected more accurately than a configuration (see FIG. 6) where the ultrasonic search unit is provided on the exposed surface side.

Also, since damage in both the repairing member 4 and the skin 2 can be detected by the ultrasonic search unit 7 alone placed on the contact face 4c side of the repairing member 4, it is possible to detect damage in the repairing member 4 and the skin 2 without providing an ultrasonic search unit on the face on the internal space 8 side of the skin 2.

Additionally, damage tends to occur in an area around the opening 3, due to stress concentration. In the embodiment, since the multiple ultrasonic search units 7 surround the opening 3, the area around the opening 3 where damage tends to occur can be targeted for detection by the multiple ultrasonic search units 7. Hence, damage that occurs in the area around the opening 3 can be detected more favorably.

Moreover, since the ultrasonic wave is transmitted in a tilted direction, the ultrasonic wave can be transmitted to the repairing member 4 and the skin 2 in a wider range in the thickness direction than when the ultrasonic wave is transmitted horizontally. Also, the ultrasonic wave can be transmitted to the repairing member 4 and the skin 2 in a wider range in the in-plane direction than when the ultrasonic wave is transmitted vertically.

Also, in the embodiment, the recess 11 is provided in the repairing member 4, and the ultrasonic search unit 7 is placed in the recess 11. Hence, the ultrasonic search unit 7 can be provided to the repair structure 1 without performing processing for installing the ultrasonic search unit 7 on the skin 2, which is a member forming the aircraft. Since the skin 2 is not subjected to processing, the repair structure 1 can be applied without reducing the strength and the like of the skin 2.

Also, since the ultrasonic search unit 7 is previously provided to the repairing member 4 in a plant or the like, work of installing the ultrasonic search unit 7 can be omitted at the repair site. Thus, less operation processes are required at the site.

Note that the present invention is not limited to the invention according to the above embodiment, and may be appropriately modified within the scope of the invention.

For example, although the ultrasonic search unit (transmitter ultrasonic search unit 7t) that transmits ultrasonic waves and the ultrasonic search unit (receiver ultrasonic search unit 7r) that receives ultrasonic waves are provided separately in the above embodiment, a transceiver ultrasonic search unit 7tr capable of both transmission and reception of ultrasonic waves may be used to detect damage by the so-called pulse echo damage detection method.

Figure 4:
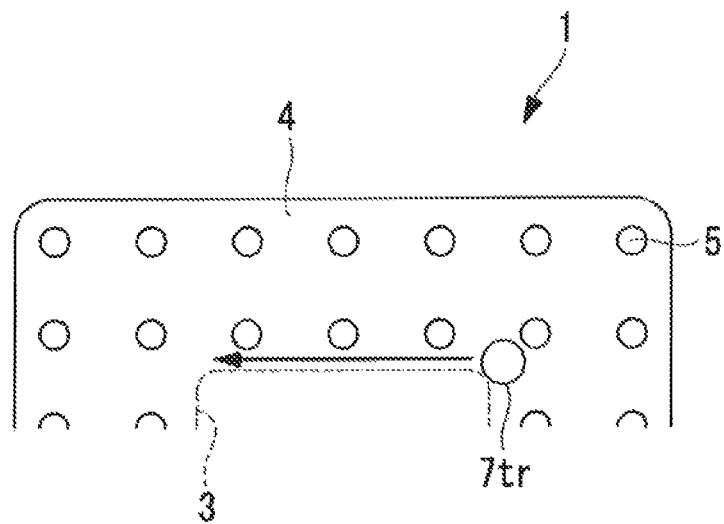
FIG. 4 is a schematic plan view of a modification of the repair structure of FIG. 1, where (A) is a diagram of a case where there is no damage, and (B) is a diagram of a case where damage has occurred.
Figure 4:
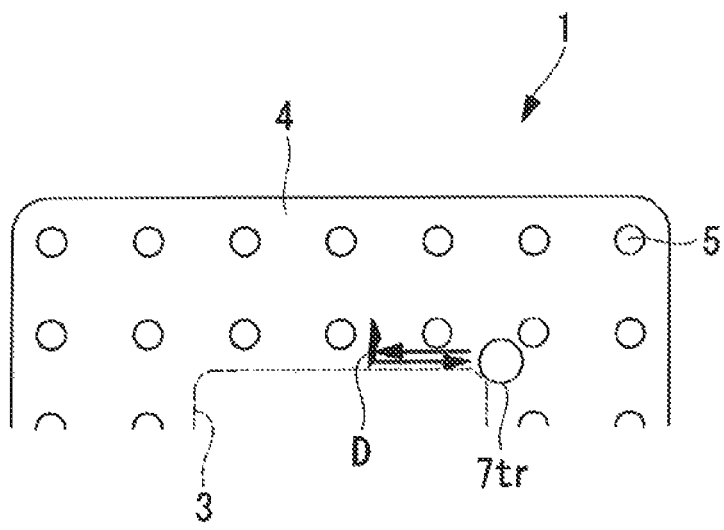

In this example, as shown in FIG. 4(A), when there is no damage, ultrasonic wave transmitted from the transceiver ultrasonic search unit 7tr continues to travel, and therefore the transceiver ultrasonic search unit 7tr does not receive the ultrasonic wave. Meanwhile, as shown in FIG. 4(B), when there is damage around the transceiver ultrasonic search unit 7tr, a transmitted ultrasonic wave is reflected by the damage, and therefore the transceiver ultrasonic search unit 7tr receives the reflected ultrasonic wave. Accordingly, when the transceiver ultrasonic search unit 7tr receives an ultrasonic wave, it can be determined that there is damage.

Figure 5:
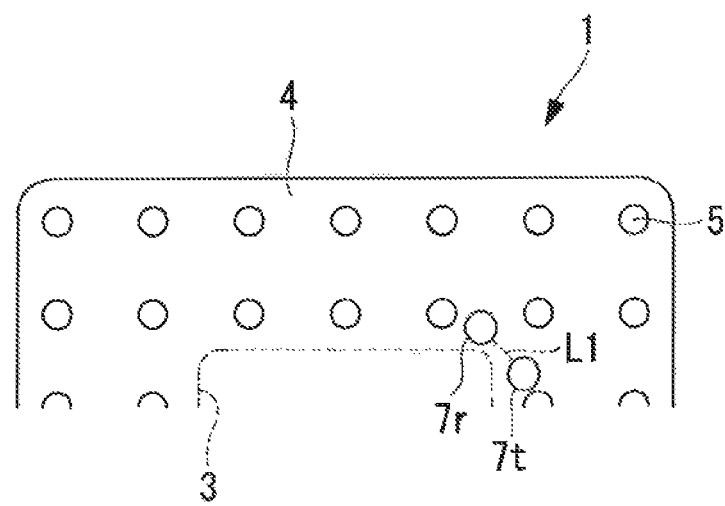
FIG. 5 is a schematic plan view of a modification of the repair structure of FIG. 1.

Moreover, the position of the ultrasonic search unit 7 is not limited to the example of the above embodiment. The ultrasonic search unit 7 may be provided anywhere to detect damage when damage occurs. For example, while one each of the ultrasonic search units 7 is placed in the four corners of the opening 3 in the above embodiment, the arrangement of the ultrasonic search units 7 is not limited to this. For example, as shown in FIG. 5, one each of the transmitter ultrasonic search unit 7t and the receiver ultrasonic search unit 7r may be placed in the four corners of the opening 3. In this case, the transmitter ultrasonic search unit 7t and the receiver ultrasonic search unit 7r are arranged so as to sandwich the corner portion of the opening 3. More specifically, the transmitter ultrasonic search unit 7t and the receiver ultrasonic search unit 7r are arranged, so that a virtual line L1 connecting the transmitter ultrasonic search unit 7t and the receiver ultrasonic search unit 7r passes the vicinity of the corner portion.

By arranging the transmitter ultrasonic search unit 7t and the receiver ultrasonic search unit 7r in this manner, of the area around the opening 3, the vicinity of the four corners of the opening 3 where damage is particularly likely to occur due to stress concentration can be targeted for detection. Hence, damage that occurs in the vicinity of the four corners of the opening 3 can be detected more favorably.

Also, while a single ultrasonic search unit 7 is placed in each recess 11 in the above embodiment, two ultrasonic search units may be placed in each recess 11. In this case, by superimposing the circular faces of the two ultrasonic search units inside the recess 11, the ultrasonic search unit in contact with the bottom face 1ib of the recess 11 in the repairing member 4 and the ultrasonic search unit in contact with the skin 2 can be provided as separate ultrasonic search units. By thus providing the ultrasonic search unit in contact with the repairing member 4 and the ultrasonic search unit in contact with the skin 2 as separate ultrasonic search units, when damage is detected, it is possible to detect in which of the repairing member 4 or the skin 2 the damage has occurred.

Additionally, the connection route of the signal wire is not limited to the route of the above embodiment. For example, a groove for signal wire may be formed in the fastener hole 2a formed in the skin 2, and the signal wire may pass through this groove. More specifically, the signal wire may be sandwiched between the skin 2 and the repairing member 4 with a sealant in a segment from the ultrasonic search unit 7 to the fastener hole 2a, and may be passed through the groove formed in the fastener hole 2a in the portion of the fastener hole 2a.

Moreover, while the recess 11 is formed in the contact face 4c of the repairing member 4 and the ultrasonic search unit 7 is placed in the recess 11 in the above embodiment, the position of the ultrasonic search unit 7 is not limited to this. A recess may be formed in the face of the skin 2 on the side in contact with the repairing member 4, and the ultrasonic search unit 7 may be placed in this recess.

Also, while the repair structure 1 is applied to the skin 2 of an aircraft in the above embodiment, the member (repairing target member) to be repaired is not limited to the skin 2 of an aircraft. While the repairing target member is a metal member in the above embodiment, the repairing target member is not limited to a metal member. For example, the repairing target member may be a composite material.

Second Embodiment

Hereinafter, a second embodiment of the present invention will be described with reference to FIGS. 7 to 11. A repair structure 20 of the embodiment is different from the first embodiment in that instead of the ultrasonic search unit 7 embedded in the repairing member 4, some of the fasteners 5 are replaced by a fastener 18 with a sensor, which includes an ultrasonic sensor 17. Note that the same parts as the first embodiment are assigned the same reference numerals, and detailed descriptions are omitted. Detailed descriptions of parts already described in the first embodiment are also omitted.

Figure 7:
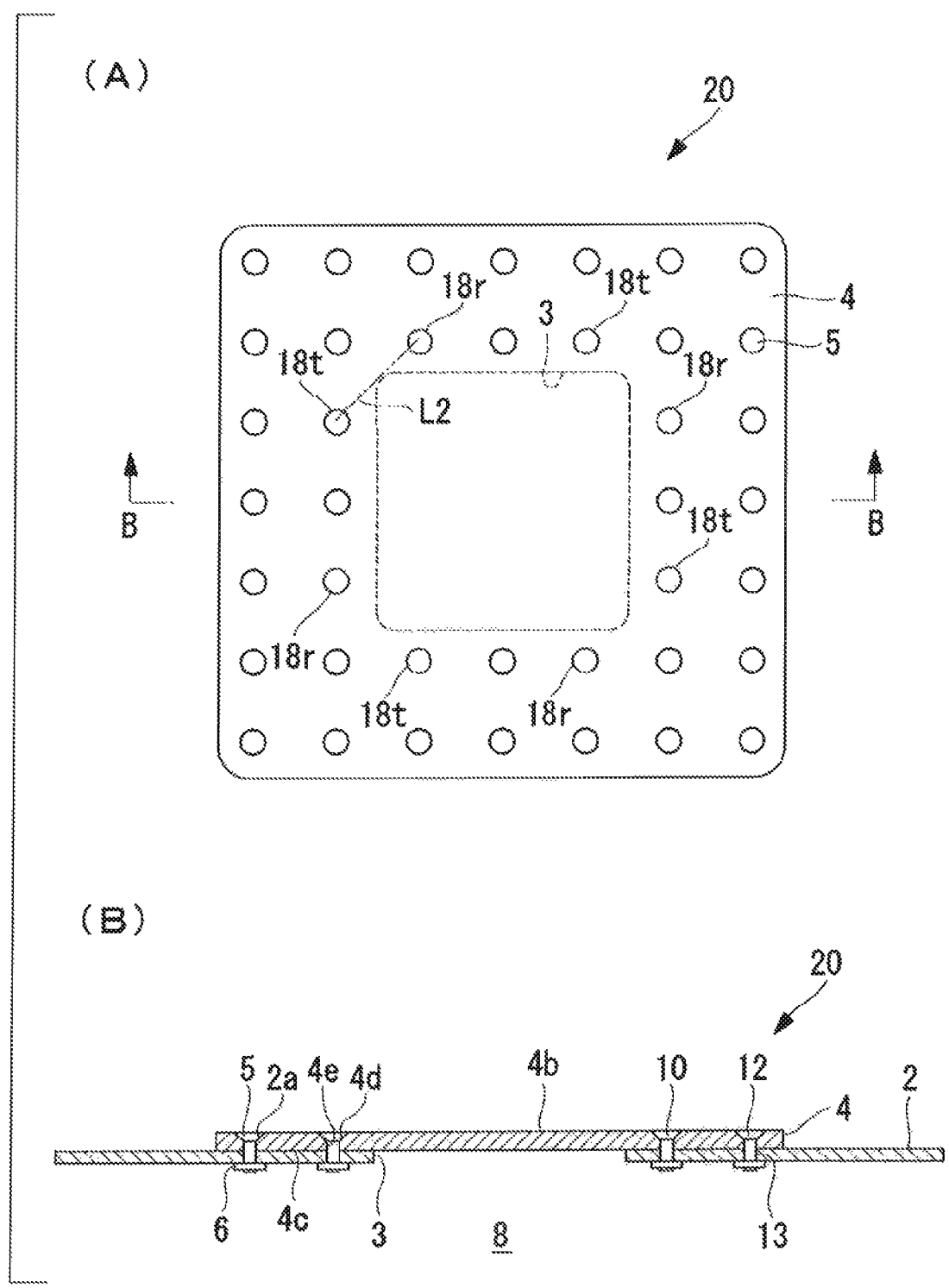
FIG. 7 is a diagram of a repair structure of a second embodiment of the present invention, where (A) is a plan view of the repair structure, and (B) is a cross-sectional view taken along arrow B-B of (A)

As shown in FIG. 7, multiple (40 in the embodiment) fastener holes 4a penetrating a repairing member 4 so as to connect an exposed face 4b and a contact face 4c are formed in a fixed part. The multiple fastener holes 4a are formed in positions corresponding to multiple (40 in the embodiment) fastener holes 2a formed in a skin 2. The fastener hole 4a has a tapered portion 4d having a tapered inner peripheral face formed so as to reduce its diameter from the exposed face 4b, and a columnar portion 4e having a columnar inner peripheral face extending from an end portion on the contact face side of the tapered portion 4d.

The fastener hole 2a formed in the skin 2 and the fastener hole 4a formed in the repairing member 4 are connected to form a fastener through hole 10. More specifically, the fastener hole 2a and the columnar portion 4e of the fastener hole 4a are connected. That is, the fastener through hole 10 is a hole that penetrates the repairing member 4 and the skin 2, and multiple (40 in the embodiment) fastener through holes 10 are formed. A fastener 5 is inserted into each of the multiple fastener through holes 10. The skin 2 and the repairing member 4 are fixed by inserting the fastener 5 into each of the multiple fastener through holes 10.

The fastener 5 has a substantially truncated cone shaped head portion (fixing part) 12, and a columnar shank portion 13 extending in a predetermined direction from the head portion 12. The head portion 12 is fitted into the tapered portion 4d. The shank portion 13 has a tip end portion 14 protruding into an internal space 8, and a base portion (fixing part) 15 connecting the head portion 12 and the tip end portion 14. The base portion (fixing part) 15 is placed inside the columnar portion 4e of the fastener hole 4a formed in the repairing member 4 and the fastener hole 2a formed in the skin 2. An annular collar 6 engages with a columnar outer peripheral face of the tip end portion 14. The engagement between the tip end portion 14 and the collar 6 fixes the skin 2 and the repairing member 4. That is, the head portion 12 and the base portion 15 fix the skin 2 and the repairing member 4.

Figure 8:
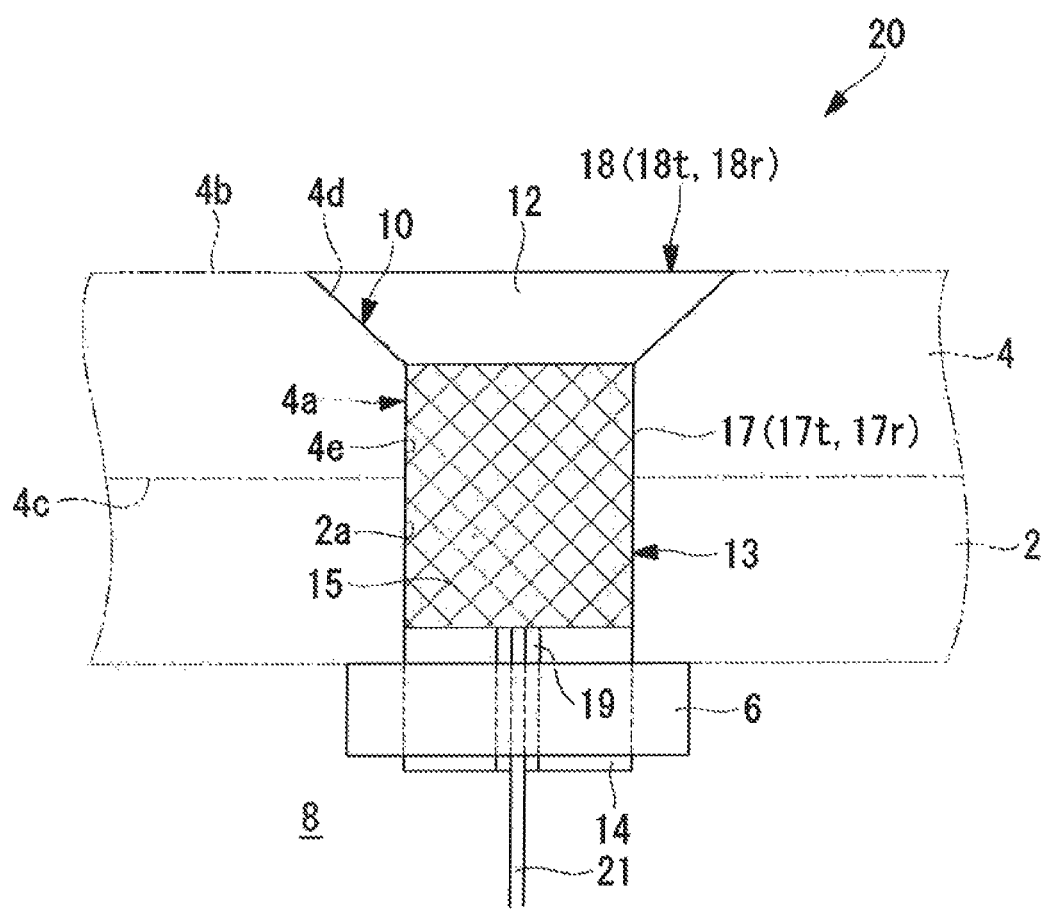
FIG. 8 is a side view of a fastener with a sensor and a collar used in the repair structure of FIG. 7.

In the embodiment, some of the fastener 5 are the fastener 18 with sensor, which includes the ultrasonic sensor 17. As shown in FIG. 8, in the fastener 18 with sensor, the ultrasonic sensor 17 is provided on the outer surface of the aforementioned base portion 15 of the fastener 5. The ultrasonic sensor 17 is formed into a cylindrical shape, and covers substantially the entire area in the axial and circumferential direction of the base portion 15. A part of the head portion side of the ultrasonic sensor 17 provided in the base portion 15 is in contact with the repairing member 4, and a part thereof on the tip end portion 14 side is in contact with the skin 2. Moreover, a groove portion 19 recessed toward the radial center from the outer surface and extending in the axial direction is formed in the base portion 15 and tip end portion 14 of the fastener 18 with sensor.

The ultrasonic sensor 17 of the embodiment includes two types which are a transmitter ultrasonic sensor 17t that transmits an ultrasonic wave, and a receiver ultrasonic sensor 17r that receives an ultrasonic wave transmitted by the transmitter ultrasonic sensor 17t. Accordingly, the fastener 18 with sensor includes two types which are a transmitter fastener 18t to which the transmitter ultrasonic sensor 17t is attached, and a receiver fastener 18r to which the receiver ultrasonic sensor 17r is attached.

Figure 9:
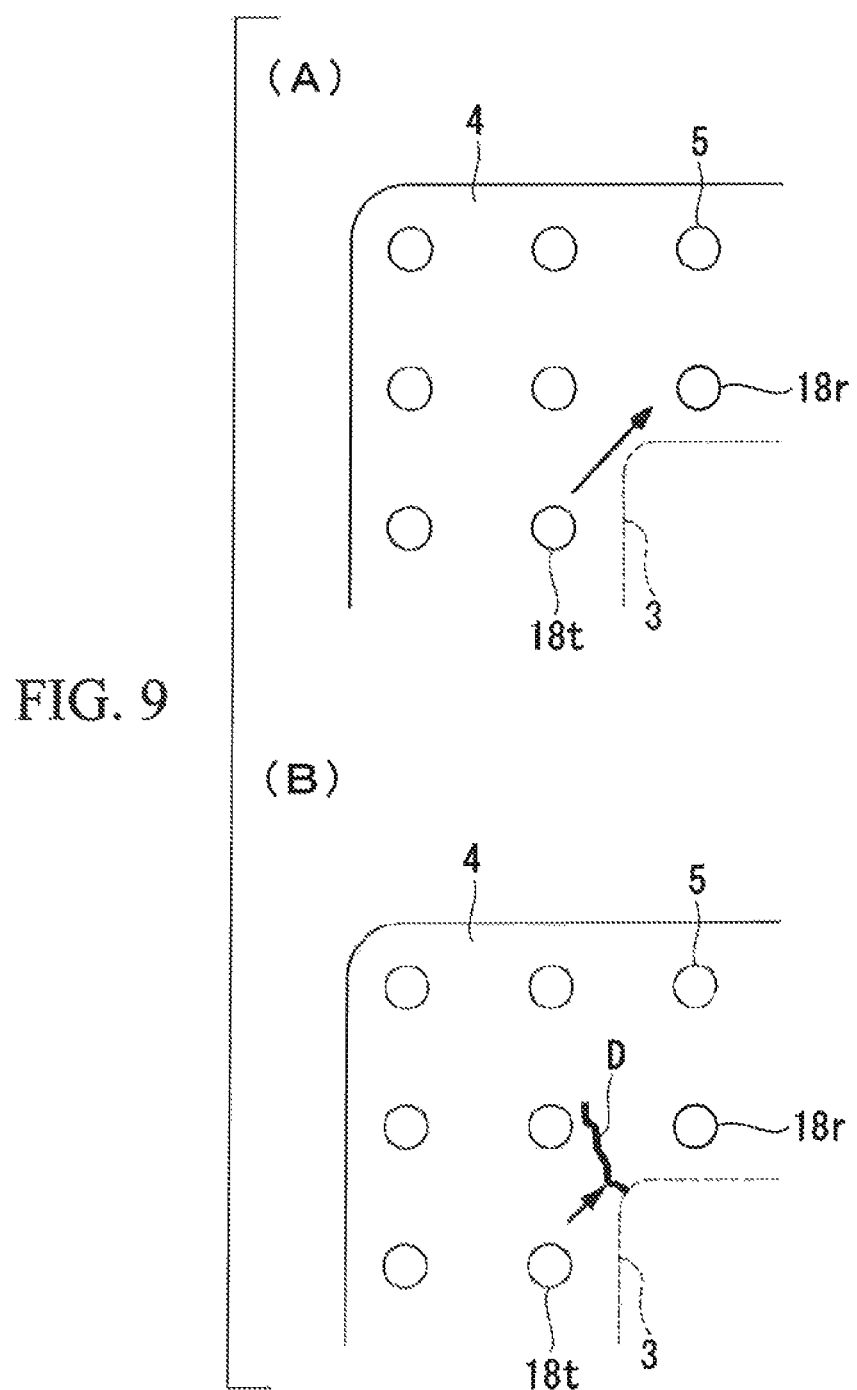
FIG. 9 is a schematic plan view of the repair structure of FIG. 7, where (A) is a diagram of a case where there is no damage, and (B) is a diagram of a case where damage has occurred.

The embodiment is provided with four fastener sets each configured of the transmitter fastener 18t and the receiver fastener 18r. The fastener sets are placed in the vicinity of the four corners of the opening 3. More specifically, as shown in FIGS. 7 and 9, the transmitter fastener 18t and the receiver fastener 18r are arranged so as to sandwich each corner portion of the four corners of the opening 3. That is, the transmitter fastener 18t and the receiver fastener 18r are arranged, so that a virtual line L2 connecting the transmitter fastener 18t and the receiver fastener 18r passes through the vicinity of the corner portion.

Note that the transmitter fastener 18t may include an ultrasonic sensor capable only of transmission to the fastener, or may include an ultrasonic sensor capable of transmission and reception to and from the fastener, and turn off the reception function by a controller or the like. The same applies to the receiver fastener 18r.

As in the case of the fastener 5 without the ultrasonic sensor 17 (hereinafter referred to as "normal fastener 5"), the fastener 18 with sensor is inserted into the fastener through hole 10, and the tip end portion 14 is fitted into the collar 6 to fix the repairing member 4 and the skin 2. Since the outer diameter of the fastener 18 with sensor is formed larger than the normal fastener 5 by the size of the ultrasonic sensor 17, the diameter of the fastener through hole 10 through which the fastener 18 with sensor is inserted may be formed larger than the fastener through hole 10 through which the normal fastener 5 is inserted. Instead, by forming the diameter of the base portion 15 of the fastener 18 with sensor smaller than that of the base portion 15 of the normal fastener 5, the same diameter of the fastener through hole 10 may be used.

A signal wire 21 is connected to the transmitter ultrasonic sensor 17t and the receiver ultrasonic sensor 17r. The signal wire 21 connects the transmitter ultrasonic sensor 17t or the receiver ultrasonic sensor 17r and a controller (not shown) placed in the internal space 8 of an aircraft. The transmitter ultrasonic sensor 17t and the receiver ultrasonic sensor 17r exchange signals with the controller through the signal wire 21. When an ultrasonic wave transmission instruction signal is transmitted to the transmitter ultrasonic sensor 17t from the controller through the signal wire 21, an ultrasonic wave is transmitted from the transmitter ultrasonic sensor 17t. When the receiver ultrasonic sensor 17r receives an ultrasonic wave, a signal is transmitted to the controller through the signal wire 21. The signal wire 21 is connected to the transmitter ultrasonic sensor 17t or the receiver ultrasonic sensor 17r through the groove portion 13.

The transmitter ultrasonic sensor 17t is configured to transmit an ultrasonic wave to the inside of the skin 2 and the repairing member 4 to be inspected, and transmits the ultrasonic wave upon application of a high voltage (aforementioned ultrasonic wave transmission instruction signal) from the controller through the signal wire 21. In the embodiment, the transmitter ultrasonic sensor 17t transmits an ultrasonic wave to the inside of the repairing member 4 from the part in contact with the repairing member 4. The transmitted ultrasonic wave propagates through the inside of the repairing member 4. Meanwhile, the transmitter ultrasonic sensor 17t transmits an ultrasonic wave to the inside of the skin 2 from the part in contact with the skin 2. The transmitted ultrasonic wave propagates through the inside of the skin 2.

The receiver ultrasonic sensor 17r is configured to receive an ultrasonic wave transmitted from the transmitter ultrasonic sensor 17t, and measures the reception state by measuring voltages on both ends of the receiver ultrasonic search unit 7r.

Next, a description will be given of a repair method of the skin 2 to which the repair structure 20 of the embodiment is applied. First, the opening 3 is formed by cutting out a damaged part having occurred in the skin 2, and the repairing member 4 is provided to cover the opening 3. The method of forming the opening 3 in the skin 2 and fastening and fixing the skin 2 and the repairing member 4 are the same as the first embodiment, and therefore detailed descriptions are omitted.

Note, however, that the embodiment is different from the first embodiment in that instead of the normal fastener 5, the fastener 18 with sensor is press-fitted into predetermined fastener through holes 10.

Next, a damage detection method by the repair structure 1 of the embodiment will be described with reference to FIG. 9. Note that in FIG. 9, the arrows schematically indicate propagation of ultrasonic waves. In the embodiment, damage is detected by the so-called through transmission damage detection method.

As described above, the ultrasonic wave transmitted from the transmitter ultrasonic sensor 17t (i.e., transmitter fastener 18t) propagates through the inside of the repairing member 4 and the skin 2. The ultrasonic wave propagating through the inside of the repairing member 4 and the skin 2 is received by the receiver ultrasonic sensor 17r (i.e., receiver fastener 18r). Upon receipt of the ultrasonic wave, the receiver ultrasonic sensor 17r transmits the reception state to the controller.

As shown in FIG. 9(A), when there is no damage in the repairing member 4 and the skin 2, the ultrasonic wave transmitted from the transmitter fastener 18t is received by the receiver fastener 18r without being blocked by any damage.

On the other hand, as shown in FIG. 9(B), when there is damage D such as a crack in the repairing member 4 or the skin 2 between the transmitter fastener 18t and the receiver fastener 18r, a part of the ultrasonic wave propagating through the inside of the repairing member 4 and the skin 2 is blocked by the damage D. The blocked ultrasonic wave does not reach the receiver fastener 18r.

Thus, when there is the damage D in any of the repairing member 4 and the skin 2 between the transmitter fastener 18t and the receiver fastener 18r, at least a part of the ultrasonic wave is blocked by the damage D. Hence, the blocked ultrasonic wave is not received by the receiver ultrasonic sensor 17r. Accordingly, when there is the damage D, the transmit-receive state of the ultrasonic wave received by the receiver fastener 18r differs from that when there is no damage.

For this reason, if information on the transmit-receive state transmitted to the controller differs from that when there is no damage between the transmitter fastener 18*t* and the receiver fastener 18*r*, it can be determined that there is damage in the repairing member 4 or the skin 2 between the transmitter fastener 18*t* and the receiver fastener 18*r*. Hence, damage can be detected.

Note that an example of a usable transmit-receive state when there is no damage, is a transmit-receive state acquired at such times as production and repair completion of the repairing member 4 and the skin 2 when health can be guaranteed.

This damage detection method may be performed during operation of an aircraft, or while operation of an aircraft is stopped. The damage detection method may be performed constantly, or be performed automatically at predetermined intervals. Instead, the damage detection method may be performed at a predetermined time such as during maintenance, for example.

The embodiment has the following effects.

In the embodiment, an ultrasonic wave is transmitted to the repairing member 4 from the fastener 18 with sensor, which includes the ultrasonic sensor 17, and the ultrasonic wave propagates through the inside of the repairing member 4. This enables detection of damage such as corrosion and cracks in the repairing member 4. Additionally, an ultrasonic wave is transmitted to the skin 2 from the fastener 18 with sensor, which includes the ultrasonic sensor 17, and the ultrasonic wave propagates through the inside of the skin 2. This enables detection of damage such as corrosion and cracks in the skin 2.

Accordingly, damage in both the repairing member 4 and the skin 2 can be detected, by merely providing the ultrasonic sensor 17 provided in the fastener 18 with sensor that fixes the skin 2 and the repairing member 4. Additionally, damage in both the repairing member 4 and the skin 2 can be detected without subjecting the skin 2 and the repairing member 4 to processing for providing a separate ultrasonic sensor. Also, since damage and the like are detected by ultrasonic waves, minute damage can be detected as well, and damages relatively far from the fastener 18 with sensor can be also detected.

Since the ultrasonic sensor 17 is provided on the outer surface of the base portion 15, the ultrasonic sensor 17 is brought into direct contact with the skin 2 and the repairing member 4. Hence, ultrasonic waves are allowed to propagate through the skin 2 and the repairing member 4 without passing through the interface between the skin 2 and the repairing member 4. Accordingly, attenuation of the ultrasonic wave at the interface can be suppressed, and damage can be detected more accurately.

Moreover, since the ultrasonic sensor 17 is exposed to the outside of the fastener 18 with sensor, the signal wire 21 can be connected easily to the ultrasonic sensor.

Additionally, since the transmitter fastener 18*t* and the receiver fastener 18*r* are arranged so as to sandwich corner portions forming the four corners of the opening 3, the vicinity of the four corners of the opening 3 where damage is particularly likely to occur due to stress concentration can be targeted for detection. Hence, damage that occurs in the vicinity of the four corners of the opening 3 can be detected more favorably.

Figure 10:
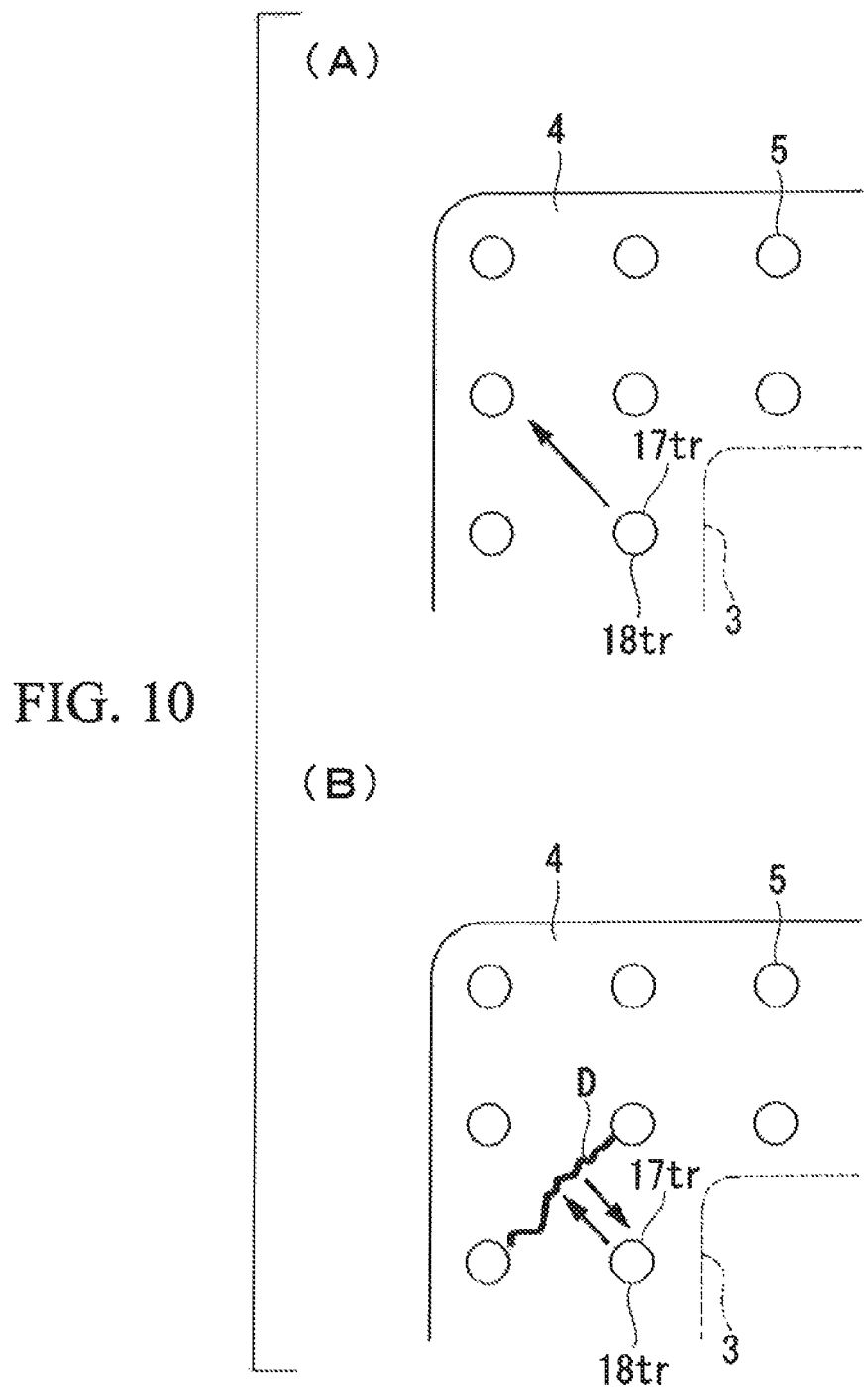
FIG. 10 is a schematic plan view of a modification of the repair structure of FIG. 7, where (A) is a diagram of a case where there is no damage, and (B) is a diagram of a case where damage has occurred.

Next, a first modification of the embodiment will be described with reference to FIG. 10.

The first modification is different from the aforementioned second embodiment in the type of ultrasonic sensor included in the fastener 18 with sensor. Note that the same parts as the second embodiment, are assigned the same reference numerals, and detailed descriptions will be omitted.

An ultrasonic sensor of the modification is a transceiver ultrasonic sensor 17*tr* capable of both transmission and reception of ultrasonic waves. That is, a fastener 18 with sensor of the modification is a transceiver fastener 18*tr* to which the transceiver ultrasonic sensor 17*tr* is attached.

In the modification, damage is detected in the so-called pulse echo damage detection method. Specifically, as shown in FIG. 10(A), when there is no damage, ultrasonic wave transmitted from the transceiver ultrasonic sensor 17*tr* continues to travel, and therefore the transceiver ultrasonic sensor 17*tr* does not receive the ultrasonic wave. Meanwhile, as shown in FIG. 10(B), when there is damage around the transceiver ultrasonic sensor 17*tr*, a transmitted ultrasonic wave is reflected by the damage, and therefore the transceiver ultrasonic sensor 17*tr* receives the reflected ultrasonic wave. Accordingly, when the transceiver ultrasonic sensor 17*tr* receives an ultrasonic wave, it can be determined that there is damage. As has been described, the modification, too, enables detection of damage in both the repairing member 4 and the skin 2, as in the case of the second embodiment. Damage can be detected particularly favorably when the damage having occurred has a vertical face relative to the propagation path of the ultrasonic wave.

Figure 11:
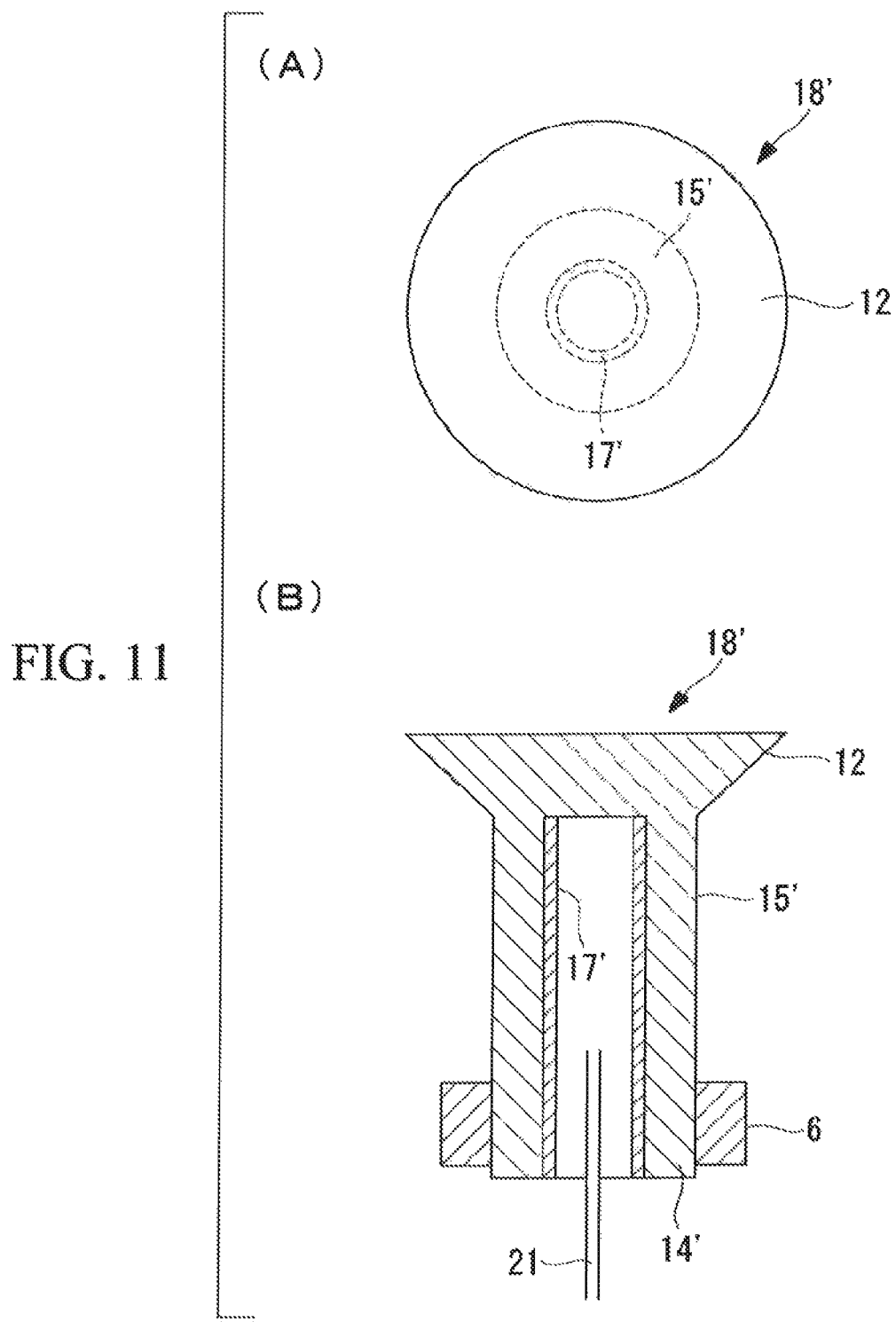
FIG. 11 is a diagram of a modification of the fastener with a sensor and the collar of FIG. 8, where (A) is a plan view, and (B) is a longitudinal section.

Next, a second modification of the embodiment will be described with reference to FIG. 11.

The second modification is different from the second embodiment in the installation position of the ultrasonic sensor of the fastener with sensor, and a part of the structure of the fastener with sensor. Note that the same parts as the second embodiment are assigned the same reference numerals, and detailed descriptions will be omitted.

A fastener 18' with sensor of the modification has a cylindrical base portion 15' and tip end portion 14', and has a spaced formed therein. An ultrasonic sensor 17' is formed into a cylindrical shape, and its outer peripheral face is brought into contact with substantially the entire cylindrical inner peripheral faces of the base portion 15' and tip end portion 14'.

Additionally, in the embodiment, the groove portion described in the second embodiment is not formed. A signal wire 21 is connected to the ultrasonic sensor 17', through the space formed inside the base portion 15' and tip end portion 14'.

In the modification, since the ultrasonic sensor 17' is provided inside the fastener 18' with sensor, the ultrasonic sensor 17' does not come into contact with a skin 2 and a repairing member 4. Hence, when the fastener 181 with sensor is inserted into a fastener through hole 10, load of the skin 2 and the repairing member 4 does not act directly on the ultrasonic sensor 17'. For this reason, excessive load is not applied on the ultrasonic sensor 17' so that breakage of the ultrasonic sensor 17' can be prevented. Also, although a load acting on the ultrasonic sensor 17' may inhibit appropriate transmission or reception of an ultrasonic wave, no excessive load acts on the ultrasonic sensor 17' in the modification, so that an ultrasonic wave can be transmitted or received appropriately.

Third Embodiment

Next, a third embodiment of the repair structure of the present invention will be described with reference to FIG. 12. The repair structure 30 of the embodiment is different from the second embodiment in the structure of the receiver ultrasonic sensor and a part, of the damage detection method. Note that the same parts as the second embodiment are assigned the same reference numerals, and detailed descriptions will be omitted. Also, the receiver fastener and the transmitter fastener are omitted from FIG. 12.

Figure 12:
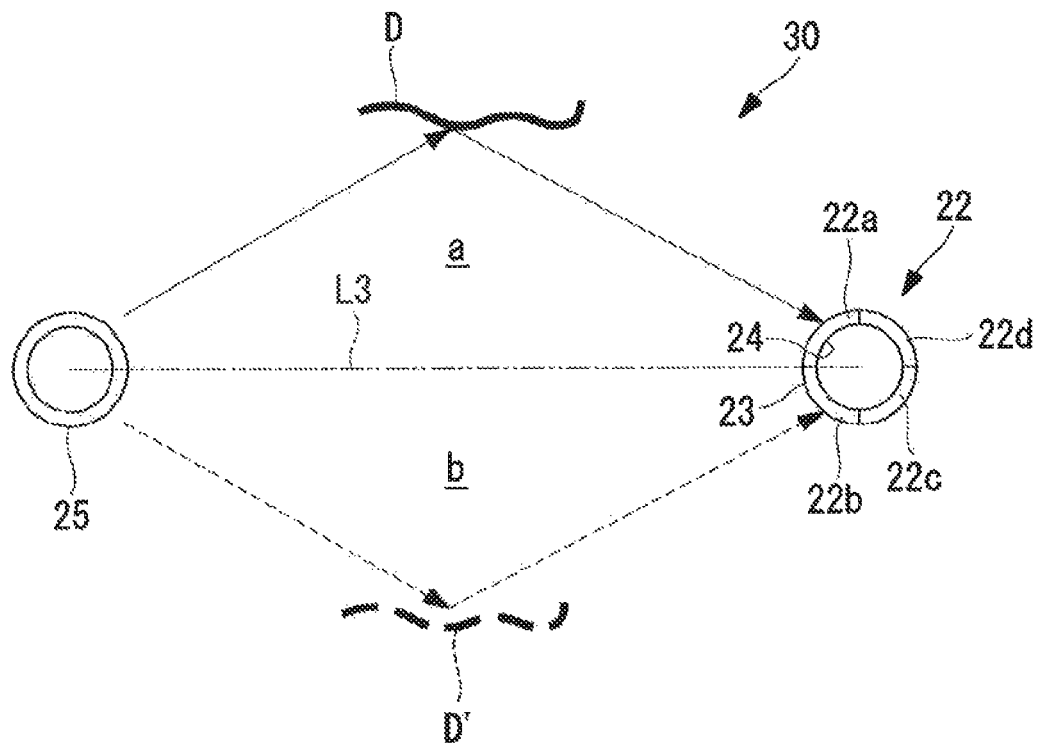
FIG. 12 is a schematic diagram of a repair structure of a third embodiment of the present invention.

As shown in FIG. 12, a receiver ultrasonic sensor 22 included in a receiver fastener of the embodiment includes four divided sensors 22a, 22b, 22c, and 22d formed into shapes of a cylinder equally divided into four parts in the circumferential direction. That is, each divided sensor has a fan-shaped section, and includes a large diameter face 23 with a large radius of curvature, and a small diameter face 24 with a small radius of curvature. The four divided sensors are arranged next to one another such that their large diameter faces 23 and small diameter faces 24 are connected.

The large diameter face 23 of the divided sensors 22a and 22b face a transmitter ultrasonic sensor 25 provided in the transmitter fastener. The divided sensor (first receiver ultrasonic sensor) 22a is arranged in an area a on one side of a virtual line L3 connecting the transmitter fastener and the receiver fastener, while the divided sensor (second receiver ultrasonic sensor) 22b is arranged in an area b on the other side of the virtual line L3.

Next, a damage detection method by the repair structure 30 of the embodiment will be described.

The transmitter ultrasonic sensor 25 included in the transmitter fastener transmits an ultrasonic wave, the ultrasonic wave is reflected by damage D, and the reflected ultrasonic wave is received by the receiver ultrasonic sensor 22. At this time, the time between transmission and reception of the ultrasonic wave is measured. The controller calculates the position of damage based on the calculated time, to thereby specify the occurrence position of the damage. Specifically, as shown in FIG. 12, according to the time between transmission and reception of an ultrasonic wave, it is possible to specify that the damage is in one of two positions (two positions which are damage D and dummy damage D' in example of FIG. 12) symmetrical with respect to the virtual line L3.

In addition, by detecting which of the four divided sensors 22a, 22b, 22c, and 22d receives the ultrasonic wave, the controller can determine the direction from which the reflected ultrasonic wave propagates. Specifically, in the example of FIG. 12, since the ultrasonic wave is received by the divided sensor 22a, it can be determined that there is damage in the area a on the one side of the virtual line L3. This is because if the ultrasonic wave is reflected by the dummy damage D', the ultrasonic wave is received by the divided sensor 22b.

Hence, according to the embodiment, the location of damage can be uniquely specified on the basis of time between transmission and reception of an ultrasonic wave, and information on the divided sensor that receives the ultrasonic wave.

Fourth Embodiment

Next, a fourth embodiment of the repair structure of the present invention will be described with reference to FIG. 13. A repair structure 40 of the embodiment is different from the second embodiment in a part, of the structure of the transmitter ultrasonic sensor. Note that the same parts as the second embodiment, are assigned the same reference numerals, and detailed descriptions will be omitted. Also, the receiver fastener and the transmitter fastener are omitted from FIG. 13.

Figure 13:
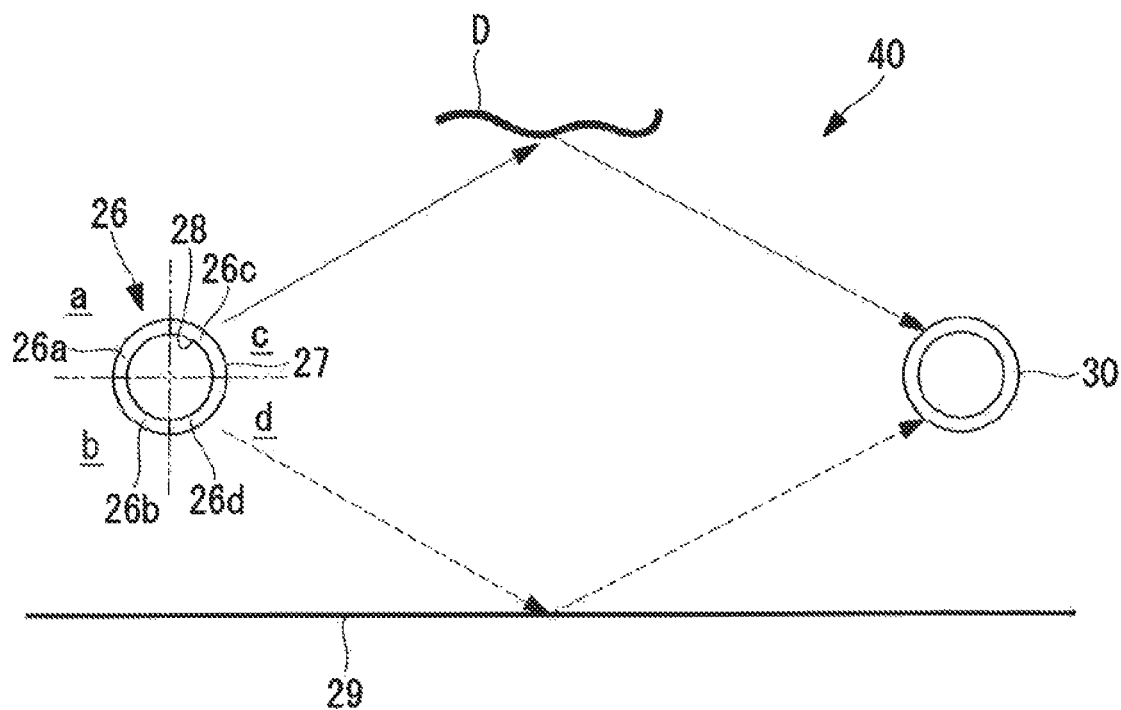
FIG. 13 is a schematic diagram of a repair structure of a fourth embodiment of the present invention.

As shown in FIG. 13, a transmitter ultrasonic sensor 26 included in a transmitter fastener of the embodiment includes four divided sensors 26a, 26b, 26c, and 26d formed into shapes of a cylinder equally divided into four parts in the circumferential direction. That is, each divided sensor has a fan-shaped section, and includes a large diameter face 27 with a large radius of curvature, and a small diameter face 28 with a small radius of curvature. The four divided sensors 26a, 26b, 26c, and 26d are arranged next to one another such that their large diameter faces 27 and small diameter faces 28 are connected. In addition, each divided sensor is provided independently, and is capable of switching ON and OFF, and adjusting the amount and intensity of the transmitted ultrasonic wave.

In the embodiment, conceptually, the four divided sensors 26a, 26b, 26c, and 26d divide the area outside the transmitter ultrasonic sensor 26 into four sections, and each divided sensor transmits an ultrasonic wave to cover its corresponding section. That is, as in FIG. 13, the divided sensor 26a mainly transmits ultrasonic waves to section a, the divided sensor 26b mainly transmits ultrasonic waves to section b, the divided sensor 26c mainly transmits ultrasonic waves to section c, and the divided sensor 26d mainly transmits ultrasonic waves to section d.

Hence, according to the embodiment, the amount and the like of an ultrasonic wave transmitted to each section can be adjusted by switching ON and OFF or adjusting the amount and intensity of transmitted ultrasonic wave of each, divided sensor. Accordingly, as shown in FIG. 13, when the transmitter fastener is placed in the vicinity of a wall 29 (or interface), the ultrasonic wave transmitted toward the section d where the wall stands is virtually useless for damage detection, and, as indicated by broken arrows, may be reflected by the wall 29 and cause erroneous detection by a receiver ultrasonic sensor 31. Hence, in such a case, the divided sensor 25d may be stopped to prevent erroneous detection and the like.

Fifth Embodiment

Next, a fifth embodiment of the repair structure of the present invention will be described with reference to FIG. 14. A repair structure 50 of the embodiment is different from the second embodiment in that an ultrasonic sensor 51 is provided in a collar 52 instead of a fastener. Note that the same parts as the second embodiment are assigned the same reference numerals, and detailed descriptions will be omitted.

Figure 14:
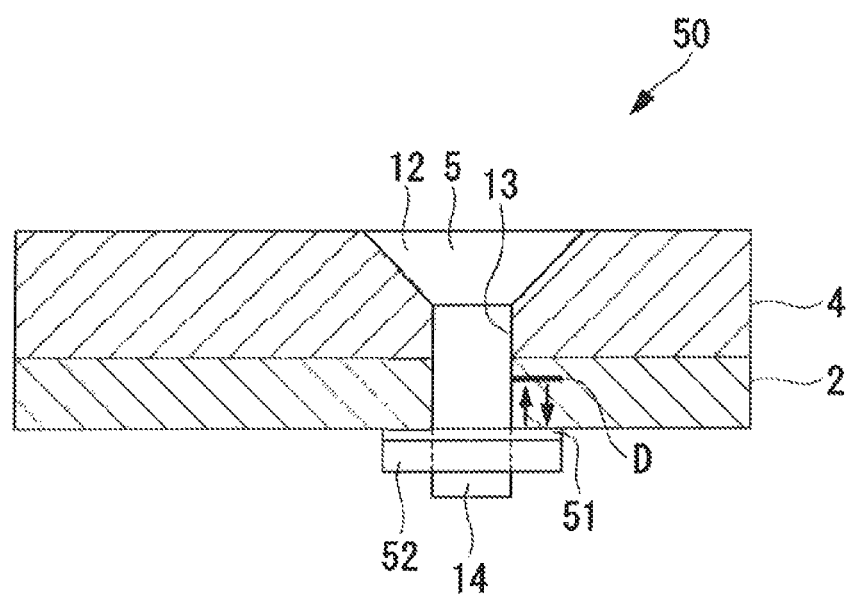
FIG. 14 is a schematic diagram of a modification of a fastener with a sensor and a collar of a fifth embodiment of the present invention.

As shown in FIG. 14, in the collar 52 of the embodiment, the ultrasonic sensor 51 is provided on a face in contact with a skin 2. The ultrasonic sensor 51 is capable of transmission and reception of ultrasonic waves.

When the ultrasonic sensor 51 of the embodiment transmits an ultrasonic wave and there is no damage at the transmission destination, the ultrasonic wave continues to travel to the interface between the skin 2 and the repairing member 4. Then, the ultrasonic sensor 51 receives the ultrasonic wave reflected from the interface between the skin 2 and the repairing member 4. On the other hand, as shown in FIG. 14, when there is damage D at the transmission destination of the ultrasonic wave, the transmitted ultrasonic wave is reflected by the damage D, and the ultrasonic sensor 51 receives the reflected ultrasonic wave. Hence, when the ultrasonic sensor 51 receives an ultrasonic wave reflected by parts other than structural parts like the interface between the skin 2 and the repairing member 4, it can be determined that there is damage D.

As has been described, according to the embodiment, damage in the repairing member 4 and the skin 2 can be detected without subjecting the skin 2 and the repairing member 4 to processing for providing a separate ultrasonic sensor. In particular, damage in the skin 2 in direct contact with the ultrasonic sensor can be detected favorably. Also, since damage and the like are detected by ultrasonic waves, minute damage can be detected as well, and damages relatively far from the collar 52 can be also detected. In particular, according to the embodiment, delamination that occurs in the skin 2 when the skin 2 is formed of a composite material can be detected favorably.

Note that the present invention is not limited to the inventions according to the above embodiments, and may be appropriately modified within the scope of the invention.

For example, while the ultrasonic sensor is provided in the base portion of the fastener in the second to fourth embodiments, the ultrasonic sensor may be provided in the head portion of the fastener.

Additionally, while the repair structure 1 is applied to the skin 2 of an aircraft in the above embodiments, the member (repairing target member) to be repaired is not limited to the skin 2 of an aircraft. While the repairing target member is a metal member in the above embodiments, the repairing target member is not limited to a metal member. For example, the repairing target member may be a composite material.

REFERENCE SIGNS LIST 1 repair structure
2 skin (repairing target member)
2a fastener hole
3 opening
4 repairing member
4a fastener hole
4b exposed face
4c contact face
4d tapered portion
4e columnar portion
5 fastener
6 collar
7 ultrasonic search unit
7a one face (repairing member contact portion)
7b other face (repairing target member contact portion)
7t transmitter ultrasonic search unit
7r receiver ultrasonic search unit
8 internal space
10 fastener through hole
11 recess
11a
11b bottom face
12 head portion (fixing part)
13 shank portion
14 tip end portion
15 base portion (fixing part)
17 ultrasonic sensor
17t transmitter ultrasonic sensor
17r receiver ultrasonic sensor
18 fastener with sensor
18t transmitter fastener
18r receiver fastener
20 repair structure
22 receiver ultrasonic sensor
22a, 22b, 22c, 22d divided sensor
26 transmitter ultrasonic sensor
26a, 26b, 26c, 26d divided sensor
30 repair structure
40 repair structure
50 repair structure
51 ultrasonic sensor
52 collar
D damage

What is claimed is:

1. A plate-like repairing member fixed to a repairing target member to cover an opening formed in the repairing target member, the repairing member comprising:
    an ultrasonic search unit placed on one face side of the repairing member that is in contact with the repairing target member, wherein
    the ultrasonic search unit includes
        a repairing member contact portion in contact with the repairing member, and
        a repairing target member contact portion contactable with the repairing target member, and
    the ultrasonic search unit is arranged along the opening.

2. The repairing member according to claim 1, wherein the ultrasonic search unit comprises a plurality of ultrasonic search units, and
the plurality of ultrasonic search units are arranged so as to surround the opening.

3. The repairing member according to claim 1, wherein the ultrasonic search unit includes a transmitter ultrasonic search unit configured to transmit an ultrasonic wave in a direction tilted with respect to the one face of the repairing member, from the repairing member contact portion and the repairing target member contact portion.

4. The repairing member according to claim 1, further comprising: a recess formed in a recessed shape on the one face side in contact with the repairing target member, wherein
the ultrasonic search unit is placed inside the recess.

5. A fastener comprising:
    a fixing part capable of fixing a repairing target member and a plate-like repairing member that covers the repairing target member; and
    an ultrasonic sensor provided on the fixing part and capable of transmitting an ultrasonic wave to the repairing target member and the repairing member, wherein
    the fixing part is inserted into a fastener through hole formed in the repairing target member and/or a fastener through hole formed in the repairing member.

6. The fastener according to claim 5, wherein the ultrasonic sensor is provided on an outer surface of the fixing part.

7. The fastener according to claim 5, wherein the ultrasonic sensor is provided inside the fixing part.

8. The fastener according to claim 5, wherein the ultrasonic sensor comprises a plurality of ultrasonic sensors.

9. A collar engaging with a tip end portion of a fastener and fixing a repairing target member and a plate-like repairing member, the fastener being inserted into a fastener through hole formed in the repairing target member and a fastener through hole formed in the repairing member that covers the repairing target member, the collar comprising:
    an ultrasonic sensor on one face side that is in contact with any one of the repairing member and the repairing target member.

* * * * *